United States Patent [19]

Jackson

[11] Patent Number: 4,753,464
[45] Date of Patent: Jun. 28, 1988

[54] MISTIE DETECTOR AND INDICATOR SYSTEM

[75] Inventor: Robert E. Jackson, Terre Hill, Pa.

[73] Assignee: Ford New Holland, Inc., New Holland, Pa.

[21] Appl. No.: 56,075

[22] Filed: Jun. 1, 1987

[51] Int. Cl.$^4$ .................. A01D 59/04; B65B 13/26
[52] U.S. Cl. ........................................ 289/2; 289/18.1
[58] Field of Search .................................. 289/2, 18.1

[56] References Cited

U.S. PATENT DOCUMENTS

| | | | |
|---|---|---|---|
| 3,188,125 | 6/1965 | Pesch | 289/2 |
| 3,416,824 | 12/1968 | Nolt et al. | 289/2 |
| 4,493,498 | 1/1985 | Vansteelant | 289/2 |

Primary Examiner—Louis K. Rimrodt
Attorney, Agent, or Firm—Griffin, Branigan & Butler

[57] ABSTRACT

A knotter mechanism, utilized on a square baler to encircle the bale with a wrapping material and tie a knot in the material after the wrap is complete, is provided with a detector mechanism for detecting knotter malfunction. The detector mechanism comprises an elongated detector pin which is mounted to pivot in a vertical plane, the pin being mounted on the twine finger of the knotter mechanism so as to pivot therewith in a horizontal plane. The pin is encircled by the wrapping material as the bale is encircled and is within the loop of wrapping material after a knot is tied. As the tied bale is moved rearwardly from the knotter station the detector pin engages the loop of wrapping material and pivots the twine finger thus causing a switch to be actuated. Failure to actuate a switch signals a knotter failure. Upon further movement of the tied bale rearwardly, the loop of wrap material slips over the end of the detector pin and a spring mechanism returns the twine finger and the pin to their initial position.

8 Claims, 4 Drawing Sheets

MISTIE DETECTOR AND INDICATOR SYSTEM

BACKGROUND OF THE INVENTION

The present invention relates to a mistie detector system for detecting the failure of a knotter to tie a knot in a loop of wrapping material extending around a bale of crop material Knotters are well known in the agricultural machinery art as exemplified by U.S Pat. Nos. 3,416,824 and 4,493,498. These devices are utilized on square balers to encircle a bale of crop material with a loop of flexible wrapping material such as twine, tie a knot in the wrapping material, and then cut it. Several knotters are usually provided for a baler, the number being governed by the size of the bales formed by the baler. In the event of a knotter failure the operator should be notified as quickly as possible so that operation of the baler may be stopped before the bale is ejected. This is particularly true in the case of large balers where the large volume of crop material in a broken bale makes it extremely difficult to manually retie the bale.

To alleviate this problem, one device uses a series of indicator flags to indicate when a knotter mistie occurs. However, this system of flags is such that it does not indicate a knotter mistie if, for example, a tied knot hangs up on the billhook.

SUMMARY OF THE INVENTION

An object of the present invention is to provide a mistie detector which reliably detects any failure of a knotter mechanism to tie a knot in a loop of flexible material surrounding a bale of crop material.

An object of the present invention is to provide a mistie detector including a detector pin which is tied within the loop of flexible material wrapped around a bale of compacted crop material, whereby the pin is moved to actuate an electrical switch as the tied bale is moved out of the knotter station.

In accordance with the principles of the present invention a knotter mechanism having a needle, a billhook and twine disc for tying a knot, and a twine finger which pivots in a horizontal plane for delivering a section of twine to the billhook, is provided with an elongated detector pin mounted on the twine finger. The detector pin is mounted on a horizontal pivot so that as crop material is forced into the knotter station, and carries with it a section of twine extending across the path of crop travel, the twine pivots the detector pin in a vertical plane, without moving the twine finger, until the twine slips over the end of the pin. The knotter then ties a loop in the twine encircling the bale and the detector pin and cuts the knotted loop from the twine supply. As the tied bale is moved out of the knotter station the loop engages the detector pin thus pivoting the pin and the twine finger in a horizontal plane. This causes a spring biased linkage attached to the twine finger to actuate a switch. Upon further movement of the bale out of the knotter station the loop of twine slips over the end of the detector pin and the bias spring returns the twine finger and detector pin to their starting position. In the event of a knotter failure the switch is not activated and the output of the switch may be utilized as an indication of the failure.

Other objects, features and advantages of the invention will become apparent upon consideration of the following description and the accompanying drawings.

BRIEF DESCRIPTION OF THE DRAWINGS

FIGS. 1–4 are schematic views illustrating the present invention in combination with a prior art knotter mechanism, the several views illustrating the relative positions of various elements during a cycle of operation, and wherein:

FIG. 1 is a top view illustrating movement of a twine finger as it delivers a twine section to a billhook;

FIG. 2 is a side view showing the twine needle at its upward extent of travel;

FIG. 3 is a side view showing a tied and cut loop of twine encircling a bale and a detector pin;

FIG. 4 is a top view illustrating movement of the twine finger and detector pin as a bale is moved out of the knotter station; and, FIG. 5 is a side view taken along line A—A of FIG. 1 illustrating the pivoting of the detecor pin in a vertical plane.

DESCRIPTION OF A PREFERRED EMBODIMENT

FIGS. 1-5 schematically illustrate the mistie detector of the present invention as associated with a prior art knotter such as that shown in Nolt Pat. No. 3,416,824. In the following description the terms "right" and "left" are for reference purposes only and are determined as if standing at the rear of the baler facing the direction of travel. Although a baler may have a plurality of knotters aligned transversely of the baler, only one knotter is illustrated in FIGS. 1–5, it being understood that all knotters are the same as the one shown.

Figure 5:
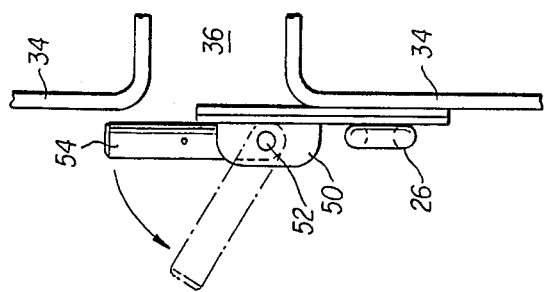
Figure 1:
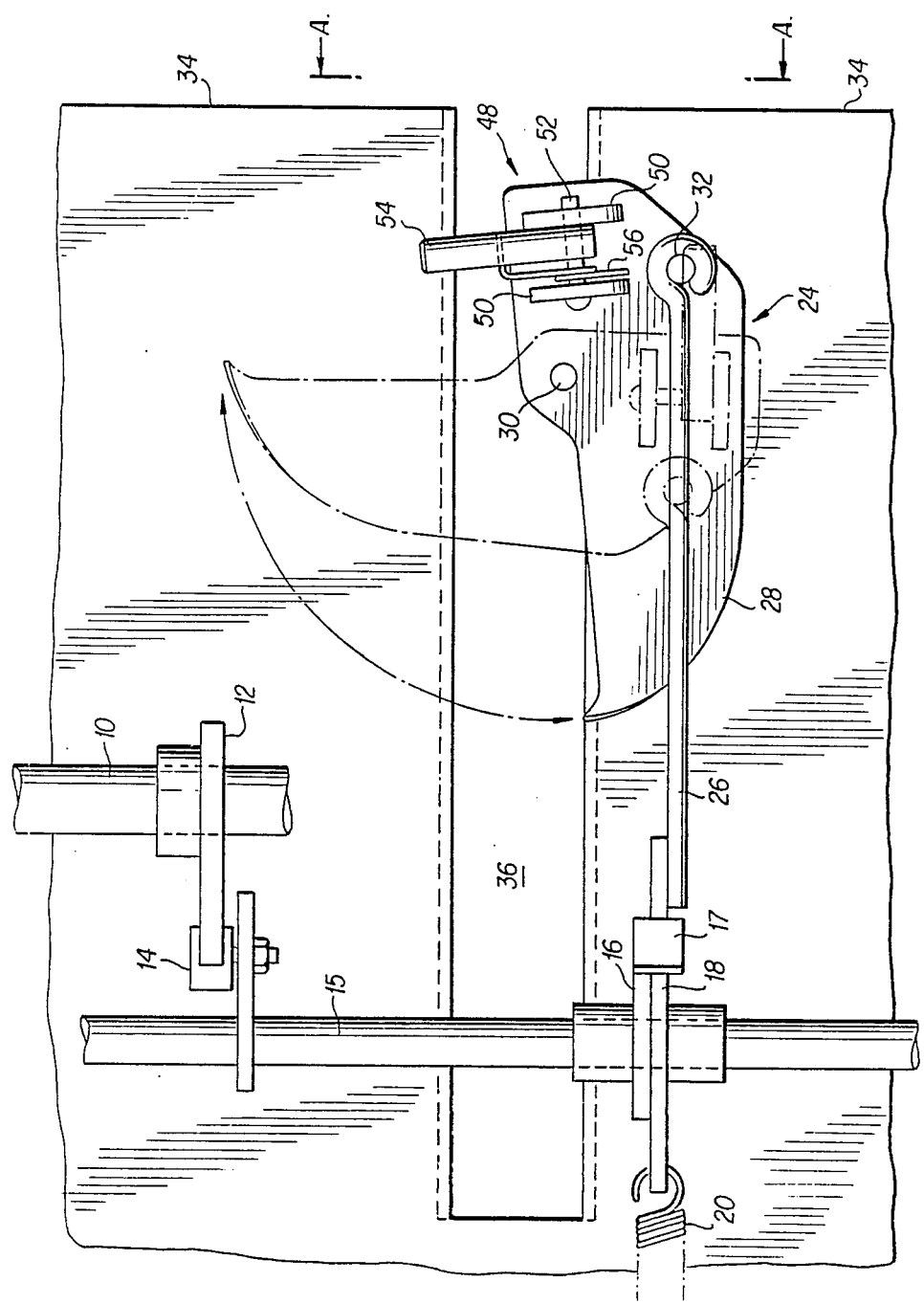
Figure 2:
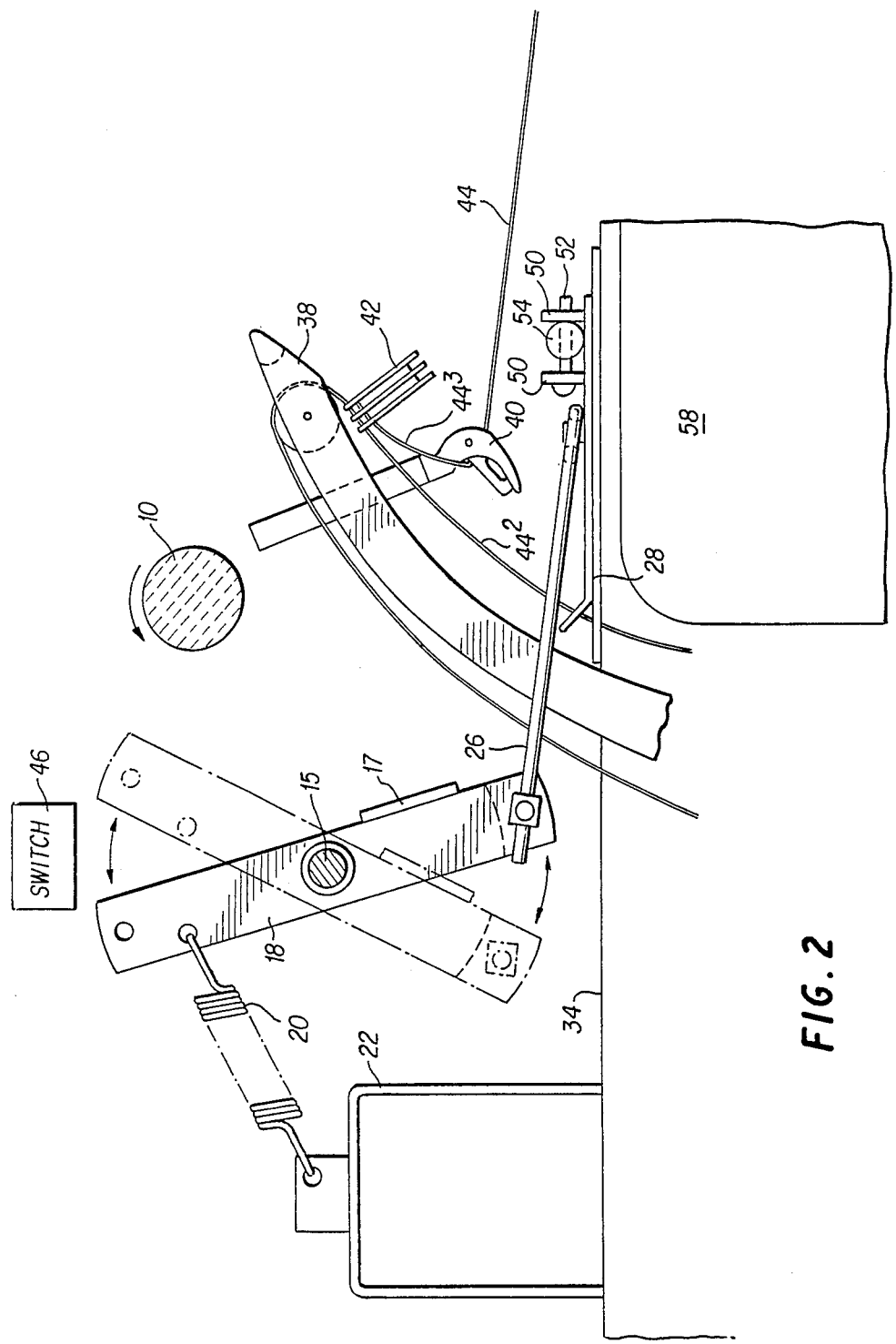

FIG. 1 is a top view of a knotter station showing a knotter mechanism comprising a knotter shaft 10 carrying a twine finger cam 12 acting against a cam follower bearing 14 to rotate a twine finger shaft 15 which drives the twine fingers of all of the knotters. Each knotter has a first lever arm 16 attached to shaft 15 and a second lever arm 18 mounted on shaft 15 but free to rotate relative thereto. A tension spring 20 is attached to lever arm 18 and to an anchor bracket 22 (FIG. 2).

A twine finger assembly 24 includes a twine finger link 26, a twine finger 28 and a twine finger pivot 30. The twine finger link 26 is pivotally attached at one end to lever arm 18 and at the other end an eyelet is provided which surrounds a pin 32 extending vertically from the twine finger 28.

The baler casing 34 is provided with slots 36 at the top and bottom thereof through which a needle 38 (FIG. 2) normally positioned below the bottom of the casing, may extend through the casing to a position above the casing. The needle 38 cooperates with a billhook 40 and a twine disc 42 to tie a knot in a twine 44 with the twine surrounding a bale 58 as described in the aforementioned patent Nolt.

In accordance with one aspect of the present invention the knotter mechanism is provided with a mistie detector comprising a mistie detector switch 46 (FIG. 2) and a mistie detector pin assembly 48 (FIG. 1). The switch may take any one of several forms but an electrical switch such as a Hall effect switch is preferred. The mistie detection assembly includes a pair of supports 50 supporting a shaft 52 which serves as a pivot permitting mistie detector pin 54 to pivot in a vertical plane. The supports 50 extend upwardly from the upper surface of twine finger 28 and a torsion spring 56 normally applies a light bias force to the pin 54 tending to rotate it downwardly as viewed in FIG. 2. The pin 54 is elongated and preferably extends across the upper slot 36 in the bale casing.

Figure 3:
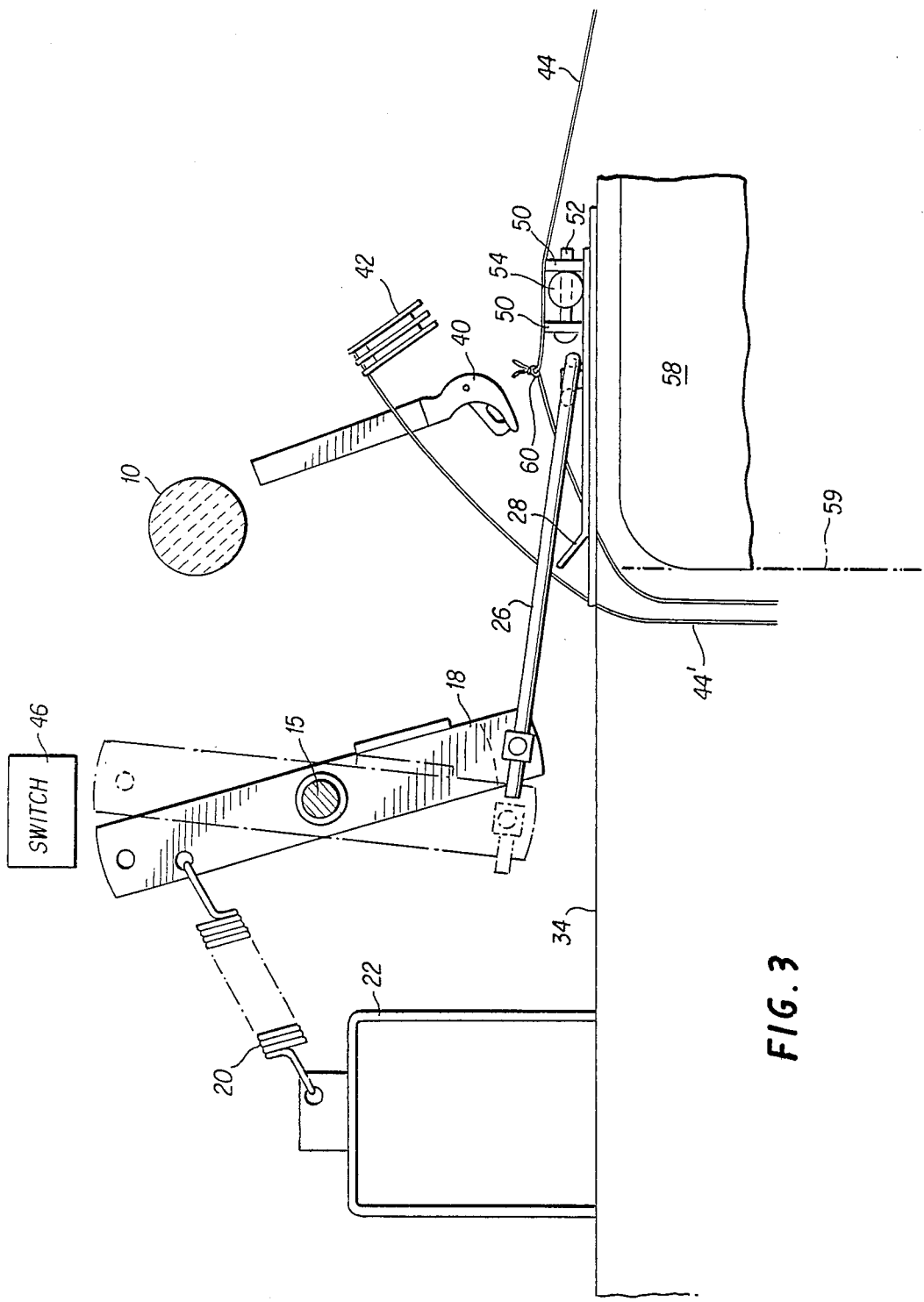

FIG. 3 shows the knotter at that point in a cycle where a bale, partially shown at 58, has been encircled with twine 44, the twine knotted at 60 and cut by a knife (not shown). The twine needle 38 has been retracted to its home position beneath the bottom of the bale casing. The end section $44^1$ of the twine supply is held by the twine disc 42 and extends downwardly through slot 36 in the bale casing to the needle 38 (not shown in FIG. 3) which has been retracted below the bale casing.

The tied bale 58 is moved rearwardly (i.e. to the right in FIG. 3) and discharged from the baler. The baler plunger (not shown) begins forming a new bale by forcing crop material into the knotter station. On each stroke, the plunger moves from left to right in FIG. 3, carrying in front of it crop material. The right-most limit of plunger travel is indicated by the line 59. As the new crop material is forced into the knotter station from the left, it strikes the section of twine $44^1$ and is partially encircled by the twine as it moves to the position occupied by the previous bale 58. As is evident from FIG. 1, this movement causes the section of twine $44^1$ to engage the underside of mistie detector pin 54 tending to cam the pin upwardly against the force of bias spring 56. The twine section $44^1$ rides up and over the end of pin 54 without causing the twine finger 28 to rotate, after which the bias spring 56 pivots the pin from the position shown in phantom outline in FIG. 5 to the position shown in solid lines. When the bale being formed at the knotter station has reached a predetermined length a clutch (not shown) is engaged so that the knotter shaft 10 is cycled one revolution. As shaft 10 rotates a force is transmitted through cam 12, cam follower bearing 14 and the twine finger shaft 15 to the lever arm 16. Lever arm 16 has an outwardly extending leg 17 which extends over lever arm 18 so that lever arm 18 is pivoted clockwise (FIG. 2) through an angle of about 45° to the position shown in phantom outline As lever arm 18 is pivoted, it acts through twine finger link 26 to pivot twine finger 28 about pivot 30 to the position shown in phantom outline in FIG. 1. The twine needle 38 has risen up through the bale casing and the twine section $44^2$ (FIG. 2) must be moved against billhook 40. This is accomplished by pivoting the twine finger 28 against twine section $44^2$. The rotation of twine finger 28 also moves the mistie detector assembly 48 away from slot 36 as best seen by the phantom outline in FIG. 1.

As the lever arm 18 is pivoted clockwise to rotate the twine finger 28, it actuates the switch 46. The output of switch 46 at this time may be used to signal the operator that a tying cycle is in progress.

As the shaft 15 rocks back to its initial position, spring 20 moves lever arm 18 back to its initial position and, through link 26, moves the twine finger assembly back to its initial position. The twine needle 38 is still raised as shown in FIG. 2 and the device is ready to tie a knot using twine sections $44^2$ and $44^3$ It will be noted that since the twine finger 28 has pivoted back to its initial positin the mistie detector pin 54 is now underneath the twine.

Figure 4:
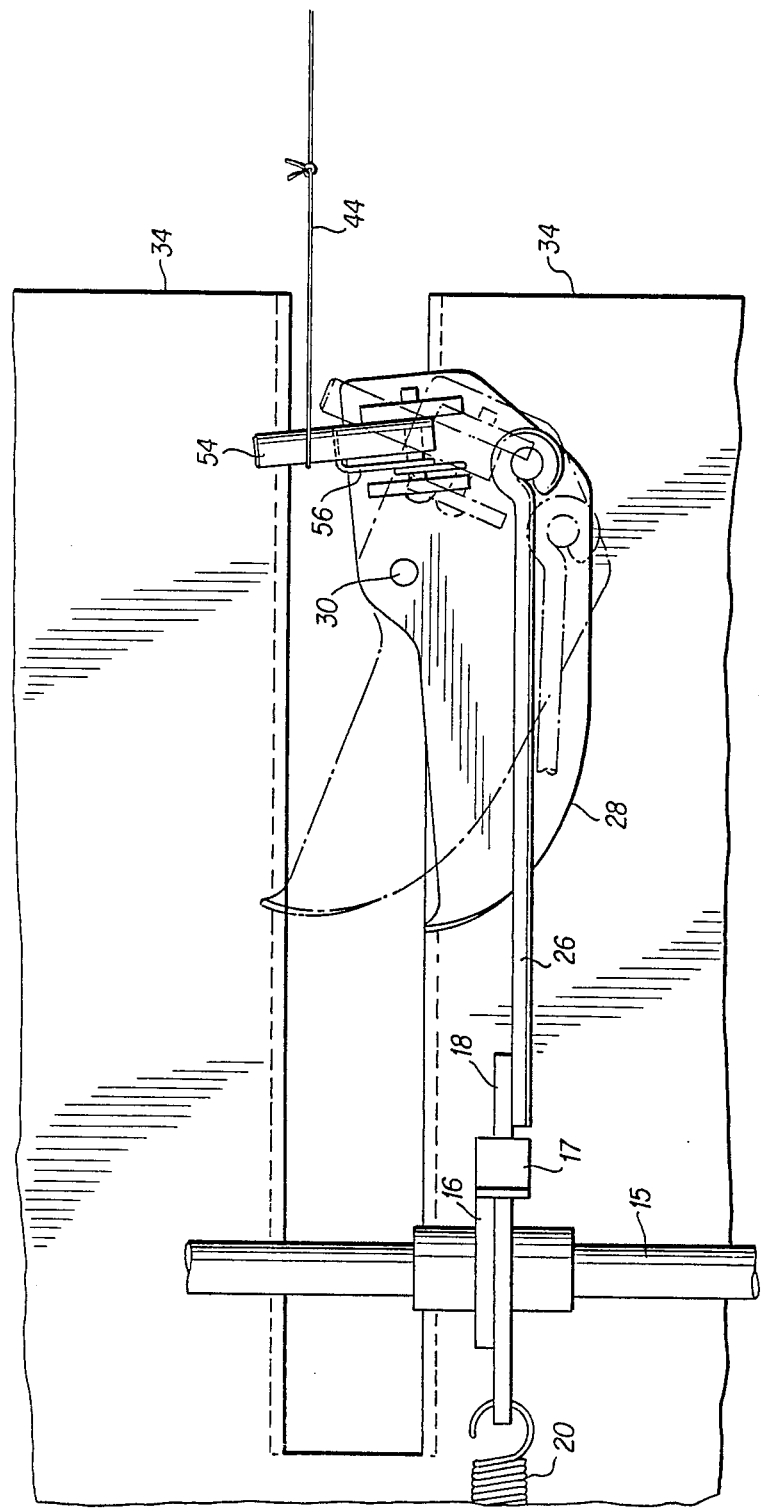

The knotter now ties a knot by rotating billhook 40 through a single revolution as fully explained in the Nolt patent and cuts the twine giving the condition shown in FIG. 3 with the twine 44 encircling bale 58 and the mistie detector pin 54. As the newly tied bale is moved to the right for discharge from the baler, the twine loop engages the pin 54 as illustrated in FIG. 4. The force exerted on the pin causes the twine finger 28 to pivot clockwise about pivot 30 to the phantom outline position shown in FIG. 4. As the twine finger pivots it acts through link 26 to pivot lever arm 18 clockwise from the solid-line to the phantom outline position shown in FIG. 3. The movement of lever arm 18 again actuates switch 46 and actuation of the switch at this time indicates that the twine was tied. As the bale is moved further to the right (FIG. 4) the loop of twine slips over the end of pin 54 thus permitting twine finger 28 to again return to its initial position.

Returning to FIG. 4, it is evident that if there is a mistie so that a knot 60 is not tied in twine 44 then the twine loop will not pivot pin 54 and twine finger 28. As a result, the switch 46 is not actuated and failure to actuate the switch at this time is an indication of a mistie. A similar indication will be given, if, for example, a knot is tied correctly but the twine hangs on the billhook.

While a preferred embodiment of the invention has been described in specific detail it will be understood that various modifications and substitutions may be made in the preferred embodiment without departing from the spirit and scope of the invention as defined as follows. For example, while the invention has been described in conjunction with a knotter for tying knots in twine, it will be understood that the invention may be practiced with knotters using other flexible elongated wrapping materials.

The embodiments of the invention in which an exclusive property or privilege is claimed are defined as follows:

1. A mistie detector for a knotter having a needle for delivering twine to a twine disc and, a twine finger for delivering the twine to a billhook, the billhook cooperating with the twine disc to tie a knot in a loop of the twine encircling a bale of crop material at a knotter station, said mistie detector comprising:

an elongated detector pin;

means pivotally supporting said detector pin on said twine finger so that said detector pin may pivot in a first plane when engaged by said twine as crop material is moved into a knotter station;

said knotter tying a knot in said twine with a loop encircling the bale and said detector pin;

a pivot about which said twine finger may pivot in a second plane orthogonal to said first plane when a bale is moved out of the knotter station and said loop engages said detector pin; and, switch means actuated by said twine finger.

2. A mistie detector as claimed in claim 1 wherein said detector pin extends across a slot in the upper side of a bale casing and said needle normally rests below said bale casing but is moved through said slot to deliver twine to said twine disc which is located above said bale casing.

3. A mistie detector as claimed in claim 2 and further comprising spring means for biasing said detector pin about said means pivotally supporting said detector pin, said spring means urging said pin toward said slot.

4. A mistie detector for a knotter station having a plurality of knotters, each of said knotters having a billhook cooperating with a twine disc to tie a knot in a loop of twine extending around a bale at said knotter station, a needle normally positioned below a bale casing but movable through lower and upper slots in said bale casing for delivering twine to said twine disc, and a twine finger pivotally supported above said bale for pivoting in a horizontal plane to deliver said twine to said billhook, and a common drive means for simultaneously driving all said knotters, said mistie detector comprising, for each of said knotters:

an elongated detector pin;

support means mounted on the twine finger for pivotally supporting said detector pin for pivoting movement in a first plane, said support means supporting said pin so that one end thereof extends across the upper slot in said bale casing;

a pivot about which said twine finger may pivot in a second plane;

a linkage for each said knotter connecting said common drive means to each of said twine fingers; and, a switch means for each said knotter actuated by the linkage of the knotter, each of said knotters tying a knot in a loop of twine extending around said bale and the detector pin associated with that knotter.

5. The mistie detector as claimed in claim 4 wherein said common drive means comprises a twine shaft and means for rocking said twine shaft to and fro once for each cycle of said knotter.

6. The mistie detector as claimed in claim 5 wherein said linkage for each knotter includes a first lever means affixed to said twine shaft, and a second lever means pivotable about said twine shaft and attached to the twine finger.

7. The mistie detector as claimed in claim 6 wherein said first lever means includes an arm extending laterally thereof for engaging and driving said second lever means as said twine shaft is rocked in a first direction; and spring means for urging said second lever means toward said laterally extending arm, said switch means for each knotter being actuated by said second lever means.

8. A mistie detector as claimed in claim 7 wherein, as a tied bale is moved out of the knotter station the loops formed in the twine engage said detector pins to pivot said twine fingers and said second lever means against the force of said spring means.

* * * * *